United States Patent

[11] 3,554,392

| | | |
|---|---|---|
| [72] | Inventor | Karl-Gustaf L. Ivstedt<br>Hogerudsgatan, Sweden |
| [21] | Appl. No. | 810,100 |
| [22] | Filed | Mar. 25, 1969 |
| [45] | Patented | Jan. 12, 1971 |
| [73] | Assignee | Ingeniorsfirman Nils Weibull A.B.<br>Malmo, Sweden<br>a Swedish Company |
| [32] | Priority | Mar. 26, 1968 |
| [33] | | Sweden |
| [31] | | 3990/68 |

[54] ARRANGEMENT IN SILOS
10 Claims, 6 Drawing Figs.

[52] U.S. Cl. .................................................. 214/17,
222/564
[51] Int. Cl. ..................................................... B65g 65/38

[50] Field of Search........................................... 214/17,
17.84; 222/464, 478, 564

[56] References Cited
UNITED STATES PATENTS
2,907,501  10/1959  Laird............................ 222/564
3,358,856  12/1967  Weibull....................... 214/17(.84)

*Primary Examiner*—Robert G. Sheridan
*Attorney*—Leon M. Strauss

ABSTRACT: A silo for storing bulk material has a shaft communicating with the storage space of the silo through openings formed between horizontally extending walls which are vertically spaced from each other. The extension and spacing of these walls is adjusted with regard to the kind of material to be stored in the silo in such a way that the slope surface from the margin of a wall facing away from the shaft will end at a distance inside the margin of an adjacent lower wall facing the shaft.

INVENTOR:
KARL-GUSTAF LENNART
IVSTEDT

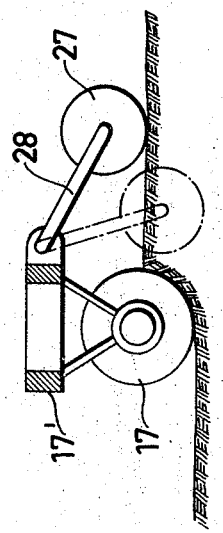
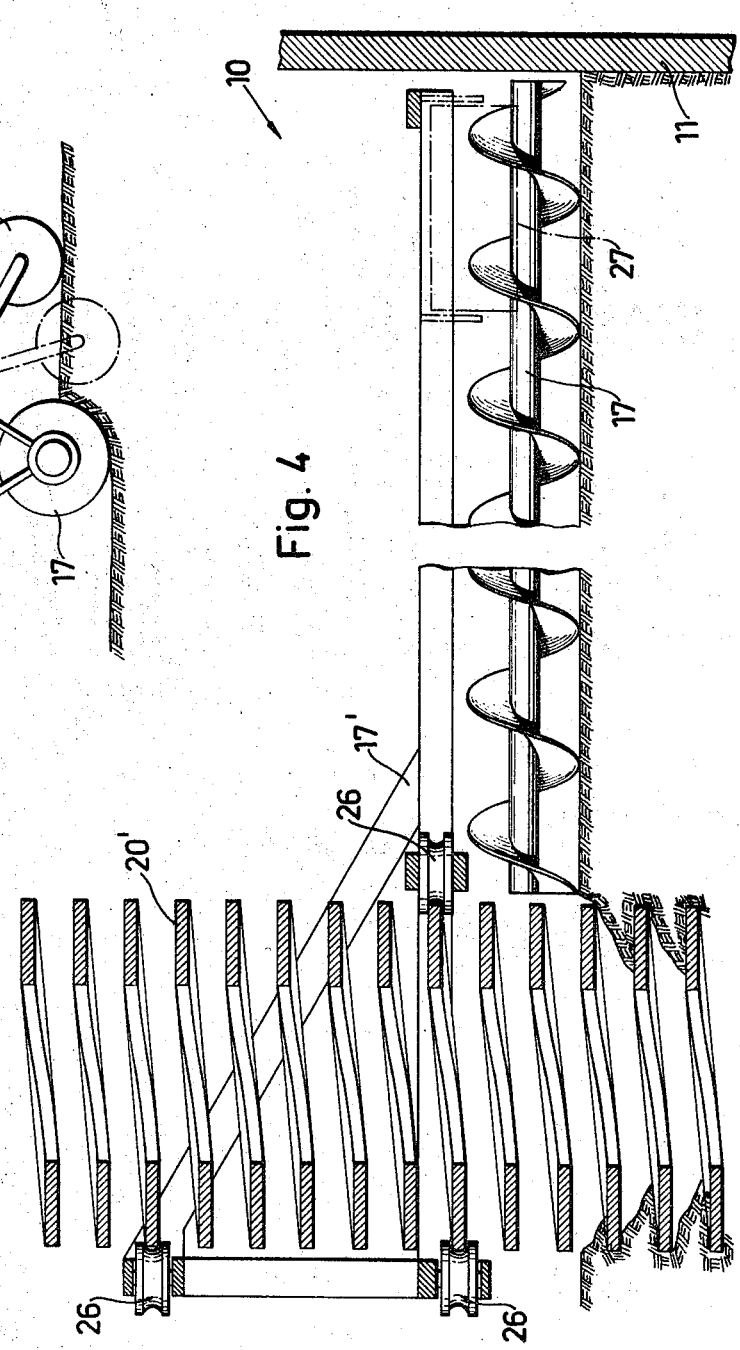

ARRANGEMENT IN SILOS

SUMMARY OF THE INVENTION

The present invention relates to silos for storing bulk material.

When discharging materials from such silos there are often problems in the cases where the stored material is apt to form lumps or vaults, and different kinds of arrangements have been proposed in order to solve these problems. In most cases it is necessary to adjust the discharge means to the specific kind of material stored. Materials consisting of large pieces, such as copra, cannot be handled with the same kind of apparatus which is used for handling highly fine-grained materials, such as sugar or starch.

The invention aims at providing an arrangement in silos for storing bulk material, comprising a conveyor for feeding the stored material from the surface thereof to lateral openings in the silo which are provided along an essentially vertical shaft, and connect the storage space of the silo with the said shaft, and has been provided especially in order to solve the problem is discharging Chile salpetre from such silos.

For this purpose the invention provides an arrangement in silos for storing bulk material, means forming an essentially vertical shaft, walls in the form of centrally perforated disc members extending horizontally and spaced vertically, the distance between adjacent disc members defining lateral openings which are provided along said vertical shaft and connect the interior storage space of the silo with said shaft, and a conveyor for feeding stored material on the surface thereof, to said lateral openings, the extension and spacing of said walls being adjusted to the kind of material being stored in such a way that the slope surface from the margin of an upper wall or disc member facing away from the shaft will terminate at a distance inside the margin of an adjacent lower wall facing the shaft. By this arrangement is achieved that the stored material cannot of itself either flow down through the shaft from the silo space, or form accumulations in the openings which might cause difficulties in the emptying operation of the silo. Accordingly as the level of material sinks in the silo during the emptying operation a certain amount of material may remain on the lower walls defining the openings, but this material will slide so far down from these walls that it cannot reach the upper wall. In other words, there will always remain an opening between the walls.

Further objects and advantages of the invention will be described in greater detail below with reference to the accompanying drawing showing an embodiment of the invention.

BRIEF DESCRIPTION OF THE DRAWINGS

FIG. 4 is a partial vertical sectional view on a larger scale of a modified embodiment of the arrangement according to the invention; and FIG. 5 is a cross-sectional view of a worm conveyor employable in the invention.

DETAILED DESCRIPTION OF THE INVENTION

Figure 1:
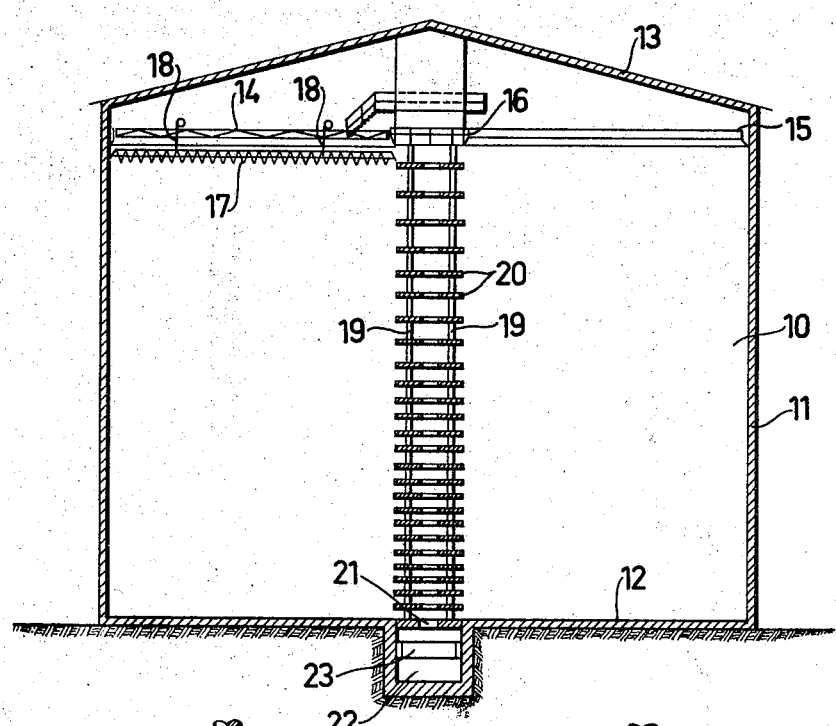
FIG. 1 is a vertical sectional view of a cylindrical silo having a discharging device according to the invention.

The silo according to FIG. 1 comprises a circular cylindrical storage space 10 which is defined by a sidewall 11, a floor 12 and a ceiling 13. Means are provided for filling the silo with materials to be discharged by gravity but these means are not shown in detail in the drawing.

In order to empty the silo there is provided therein a radial travelling crane 14 which can run on an outer annular rail 15 extending along the sidewall 11, and an inner annular rail 16 suspended from the ceiling. A worm conveyor 17 is suspended in the travelling crane 14 by means of lift cables 18 and is adapted to rest on the surface of the stored bulk material in order to scrape material radially and inwardly from the sidewall 11 towards the vertical central axis of the silo, the conveyor being all the time moved about the said axis due to the fact that the travelling crane 14 runs on the rails 15 and 16, and is lowered from the travelling crane by means of the cables 18 accordingly as the level of material sinks within the silo. This arrangement for feeding the stored material to the central axis of the silo is well-known per se. In order to convey the material further out of the silo along its central axis there are provided different kinds of arrangements, and the arrangement which is generally provided consists in providing a central column and in introducing the material into said central column in order that it may be conveyed by means of a worm conveyor or a bucket elevator or by falling freely by gravity down through the central column to a conveyor located therebelow and to be conveyed further therefrom to an external discharging station. The arrangement according to the invention can also be said to comprise a central column but of a very special type.

According to the invention, a number of vertical support rods 19 are provided around and parallel to the central axis of the silo, and these rods may be secured in the floor 12 and in the ceiling 13 of the silo, or in the device by mans of which the annular rail 16 is suspended from the ceiling of the silo. The rods 19 carry a number of circular plane annular disc members 20 which are arranged coaxially with the central axis of the silo spaced from each other longitudinally thereof. Central circular openings in the disc members 20 form a vertical shaft which is connected through a central opening 21 in the floor 12 with a tunnel 22 in which there is provided a belt conveyor 23 for conveying material falling down through the shaft and through the opening 21 out of the silo to a discharging station located outside the silo. The discs 20 define peripheral lateral openings in the central column in the silo formed by the discs and the rods, said openings establishing a communication between the storage space 10 and the vertical shaft in the central column. The outer and inner diameters of the discs 20 and the internal spacing of the discs are dimensioned in such a way in relation to the stored material that the slope surface formed between two adjacent discs and represented in FIG. 2 by a dot and dash line 24 extending from the outer margin of the upper disc will end at a distance inside the inner margin of the lower disc. This means that material in the silo cannot of itself flow down between adjacent disc members 20 into the vertical central shaft formed by the discs. In the lower portion of the silo the slope surface between two adjacent discs will form an angle with the horizontal plane which is less than the corresponding angle in the upper portion of the silo dependence on the inner friction of the stored material and its unity volume weight, and consequently it is necessary to adjust the dimensions of the discs and their spacings to the smallest angle. As it is, however, desirable to have an opening between the discs 20 which is as short as possible and at the same time of as large cross-sectional area as possible in order that the opening may block the introduction of the material into the shaft as little as possible, it may be advisable to let the distance between the discs 20 decrease from above in downward direction, as shown in FIG. 1.

Figure 2:
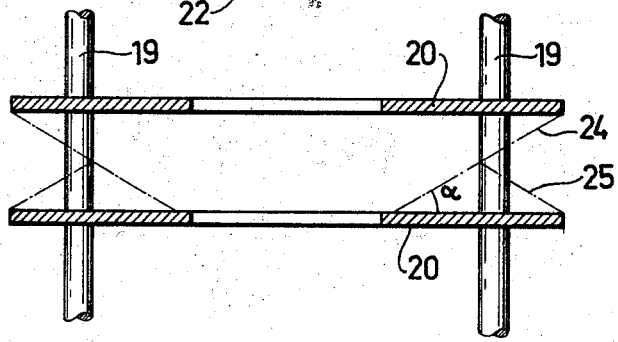
FIG. 2 is a vertical sectional view on a larger scale of a pair of walls located adjacent each other and adjoining an opening communicating with the shaft.
Figure 3:
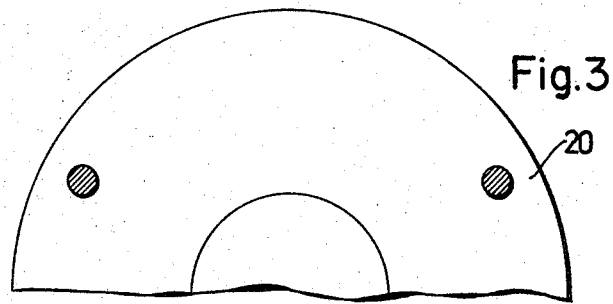
FIG. 3 is a partial plan view, also on a larger scale, of one of the walls.

When the silo is to be emptied, the material is moved without difficulty by means of the worm conveyor 17 into the central shaft and is then allowed to fall through the shaft down onto the conveyor 23, and when the level of material in the storage space 20 sinks below a certain disc 20, the material will slide down from the disc at the outer margin thereof and will form a slope surface which is designated by means of a double dot and dash line 25 in FIG. 2. The material which thereafter remains on the discs after the silo has been emptied represents, however, an insignificant portion of the total storage volume. It may occur that the material remaining on the discs will harden but this is of no importance since between the top of the remaining material and the disc 20 located thereabove, there is a space through which material can be pressed into the shaft when the silo is eventually to be emptied again after having been filled anew. The material passing through said space will soon bring along the material remaining on the discs 20 from previous storings.

Figure 2A:
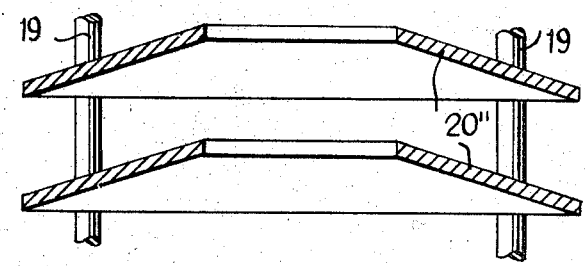
FIG. 2a is a fragmentary sectional view, somewhat modified but similar to FIG. 2, reference thereto being had in the specification.

The invention is not limited to the embodiment shown but may be varied within the scope of the appended claims, and as an example of these modifications it may be mentioned that the arrangements according to the invention can be applied also to other storage spaces and those having a circular cylindrical shape. The discs 20 may for instance be provided as square discs distributed along a vertical slot in a sidewall of a storage space at one side of the said wall, while a shaft is provided on the other side of the wall. It is also possible to shorten the horizontal dimension of the discs —in the embodiment shown, the radial dimension between the outer and inner peripheral margins—by making the discs oblique so that the inner margin will be located at a higher level than the outer margin. In the embodiment shown this would mean that the disc members 20″ (FIG. 2a) would have the shape of a truncated cone with respect to their total section.

In order that the material may not enter the shaft through the openings between the discs 20 while the silo is being filled, in which connection material falling down into the silo from above may splash around in the storage space, it may be advisable to provide a shutting device in the shaft which may consist in the embodiment shown of for instance an inflatable plug which is carried by a central tube in the shaft and extends over at least part of the length of the shaft from its lower end. This plug will normally enclose the tube but may be inflated so that it comes into contact with the inner margins of the discs 20, thereby forming a shutting wall therebetween.

Due to the fact that the discs 20 are provided continuously like the turns of a helical winding, said helical winding may serve to carry the worm conveyor 17, whereby the travelling crane 14 can be dispensed with, and this is shown in FIGS. 4 and 5.

According to FIG. 4, the disc members 20 form a continuous helical winding which is assumed to be provided as a central column in the circular cylindrical storage space 10. Consequently, there are no individual discs, but each turn in said helical winding is equivalent to a disc in the embodiment first described. Vertical rods 19 may be provided in the manner described above but are not shown in FIG. 4. The frame 17′ of the worm conveyor 17 is guided with grooved rollers 26 on the peripheral margin of the helical winding so that the conveyor may be screwed axially upward or downward on the helical winding by rotation about the axis of the helical winding. When the silo contains stored pulverulent material and the conveyor 17 rests on the surface of said material, as shown in FIG. 4, and when the silo is to be emptied, in which connection the conveyor scrapes the material radially inward towards the openings between the turns 20′ in the helical winding in order that the material may fall down through the vertical shaft defined by the turns of the helical winding in a manner described previously, the conveyor will sink successively of its own weight accordingly as the level of material in the storage space sinks, while performing a rotary motion about the axis of the helical winding, i.e. the central axis of the storage space, generated by the screw engagement between the frame 17′ and the helical winding. In order that the worm conveyor during the emptying of the silo may always rest on the stored material and may not dig into the said material more quickly than it is possible to discharge the material through the central shaft, the pitch of the helical winding must be adjusted to the capacity of the worm conveyor 17.

When the silo is to be filled with material, which is done by allowing the material to fall freely down into the silo from above, as mentioned herein the worm conveyor may serve to even out the material on the surface, but for this purpose special means are required in order to swing the worm conveyor in such a direction that it will be screwed axially up along the helical winding. In the embodiment shown a supporting roller 27 is provided for this purpose, said roller being carried by arms 28 which are swingably mounted on the frame 17′. When the silo is being emptied the said supporting roller may run freely on the surface of the material, as is shown in continuous lines in FIG. 5, or may be swung upwards out of contact with the material. However, when the silo is being filled, the supporting roller will rest on the surface of the material, in which connection the supporting roller will occupy the position shown in dot and dash lines in FIG. 5 and will be rotated by driving means provided for this purpose. The supporting roller 27 may for instance be driven from the worm conveyor 17 by means of a suitable transmission. In that case, the rotational direction of the supporting roller is such that the worm conveyor 17 will be swung in the right direction about the axis of the helical winding. When the silo is being filled the worm conveyor 17 is allowed to rotate in order to even out the supplied material radially outwardly towards the wall 11, the supporting roller 27 being allowed to roll on the material collecting adjacent the wall 11.

I claim:

1. In a silo for storing and feeding bulk material; means forming an essentially vertical shaft, said means including a series of walls in the form of annular disc members extending horizontally and spaced vertically from each other along the central axis of the silo, adjacent members forming therebetween lateral openings which are provided along said vertical shaft and connect the interior storage space of the silo with said shaft, and a conveyor for feeding stored material from the surface thereof to said lateral openings, the extent of and spacing between said members being adjusted to the kind of material being stored in such a way, that the slope surface from the margin of an upper member remote from the shaft terminates a distance inside the margin of an adjacent lower member in proximity of the shaft.

2. An arrangement as claimed in claim 1, in which the spacing of the members decreases in a direction from the top downwardly along the shaft.

3. An arrangement as claimed in claim 1, in which the members are inclined in such a way that the margin of a member facing the shaft is located higher than the margin of the same remote from the shaft.

4. An arrangement as claimed in claim 3, in which each of the members forms an inclined plane disc.

5. An arrangement as claimed in claim 1, in which said annular disc members are carried by supports and are distributed and coaxially aligned along the central axis of said silo.

6. An arrangement as claimed in claim 3, in which a number of annular disc members distributed along the central axis of said silo assume the shape of a truncated cone with respect to the entire section thereof.

7. An arrangement as claimed in claim 1, in which the members form winding turns in a continuous helical winding.

8. An arrangement as claimed in claim 7, in which said conveyor is mounted on the helical winding in order to be moved along said winding in the matter of a nut.

9. An arrangement as claimed in claim 1, in which a supporting roller is provided on said conveyor at the radially outward end thereof.

10. An arrangement as claimed in claim 9, in which the supporting roller is swingable into and out of contact with the surface of material stored in the silo.